US011181906B2

United States Patent
Yasunami

(10) Patent No.: US 11,181,906 B2
(45) Date of Patent: Nov. 23, 2021

(54) TRANSPORT VEHICLE SYSTEM AND COMMUNICATION METHOD IN TRANSPORT VEHICLE SYSTEM

(71) Applicant: MURATA MACHINERY, LTD., Kyoto (JP)

(72) Inventor: Kentaro Yasunami, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 603 days.

(21) Appl. No.: 16/145,248

(22) Filed: Sep. 28, 2018

(65) Prior Publication Data
US 2019/0129414 A1 May 2, 2019

(30) Foreign Application Priority Data
Nov. 2, 2017 (JP) .............................. JP2017-212598

(51) Int. Cl.
 *G05D 1/00* (2006.01)
 *G05D 1/02* (2020.01)
(52) U.S. Cl.
 CPC ......... *G05D 1/0027* (2013.01); *G05D 1/0297* (2013.01); *G05D 2201/0216* (2013.01)
(58) Field of Classification Search
 None
 See application file for complete search history.

(56) References Cited

U.S. PATENT DOCUMENTS

| | | | |
|---|---|---|---|
| 5,061,922 A | | 10/1991 | Nishijima et al. |
| 5,832,363 A | * | 11/1998 | Moriya ...................... B66B 1/34 |
| | | | 455/11.1 |
| 2010/0115050 A1 | * | 5/2010 | Sultenfuss ............ G06F 16/972 |
| | | | 709/217 |
| 2016/0274586 A1 | * | 9/2016 | Stubbs ............. G06K 19/07762 |

FOREIGN PATENT DOCUMENTS

| | | |
|---|---|---|
| JP | 11-96491 A | 4/1999 |
| JP | 5360034 B2 | 12/2013 |

\* cited by examiner

*Primary Examiner* — Todd Melton
*Assistant Examiner* — Jason R Roberson
(74) *Attorney, Agent, or Firm* — Keating & Bennett, LLP

(57) ABSTRACT

A transport vehicle system includes transport vehicles each including a transport-vehicle-side communication unit, and a system controller including a controller-side communication unit to transmit a command in a predetermined order to any one of the transport vehicles as a destination and receiving a report from the transport vehicle being the destination. When receiving a command addressed to itself from the controller-side communication unit, the transport-vehicle-side communication unit transmits a report to the controller-side communication unit when a predetermined waiting time elapses after receiving the command. Meanwhile, the transport-vehicle-side communication unit transmits an interrupt request to the controller-side communication unit within a waiting time when intercepting a command addressed to another transport vehicle from the controller-side communication unit during a predetermined event in itself.

6 Claims, 5 Drawing Sheets

TRANSPORT VEHICLE SYSTEM AND COMMUNICATION METHOD IN TRANSPORT VEHICLE SYSTEM

CROSS REFERENCE TO RELATED APPLICATIONS

This application claims the benefit of priority to Japanese Patent Application No. 2017-212598 filed on Nov. 2, 2017. The entire contents of this application are hereby incorporated herein by reference.

BACKGROUND OF THE INVENTION

1. Field of the Invention

The present invention relates to communication between a system controller and a transport vehicle in a transport vehicle system.

2. Description of the Related Art

There is known a transport vehicle system in which a system controller and a transport vehicle communicate with each other by a polling method (JP 5360034B). In the transport vehicle system of JP 5360034B, the system controller polls transport vehicles (sequentially inquires one by one), and the transport vehicles each report its own state to the polling (inquiry to itself). Accordingly, the system controller communicates with the transport vehicles. JP 5360034B defines a transport vehicle approaching a curved section and a transport vehicle or the like traveling in a blocking area as priority communication transport vehicles. The system controller stores the priority communication transport vehicles and polls only the priority communication transport vehicles in addition to normal polling. This increases communication frequency between the priority communication transport vehicles and the system controller to more than the communication frequency between other transport vehicles and the system controller.

When a transport vehicle completes unloading, a new transport command can be assigned thereto. In addition, when an anomaly occurs in a transport vehicle, a traveling route is blocked. As a result, it is necessary to enable subsequent transport vehicles to change their traveling routes. When the system controller can respond promptly in response to occurrence of such an event, transport efficiency is improved. Unfortunately, it is difficult for the system controller to preliminarily grasp that these events will occur to preliminarily register them as priority communication transport vehicles.

SUMMARY OF THE INVENTION

Preferred embodiments of the present invention provide improvements for transport efficiency of transport vehicle systems by enabling a transport vehicle to report an occurrence of an event affecting transport efficiency to a system controller without waiting for an order of polling.

A transport vehicle system according to a preferred embodiment of the present invention includes a plurality of transport vehicles each including a transport-vehicle-side communication unit, and a system controller including a controller-side communication unit to transmit a command in a predetermined order to any one of the plurality of transport vehicles as a destination and receiving a report from the transport vehicle being the destination, the system controller controlling the plurality of transport vehicles via polling communication, wherein the transport-vehicle-side communication unit transmits the report to the controller-side communication unit when a predetermined waiting time elapses after receiving the command addressed to itself from the controller-side communication unit, and the transport-vehicle-side communication unit transmits an interrupt request to the controller-side communication unit within the waiting time when intercepting the command addressed to another transport vehicle from the controller-side communication unit during a predetermined event in itself.

In addition, a communication method in a transport vehicle system according to a preferred embodiment of the present invention is for the transport vehicle system that includes a plurality of transport vehicles each including a transport-vehicle-side communication unit, and a system controller including a controller-side communication unit to transmit a command in a predetermined order to any one of the plurality of transport vehicles as a destination and receiving a report from the transport vehicle being the destination, the system controller controlling the plurality of transport vehicles via polling communication, the communication method including causing the transport-vehicle-side communication unit to transmit the report to the controller-side communication unit when a predetermined waiting time elapses after receiving the command addressed to itself from the controller-side communication unit; and causing the transport-vehicle-side communication unit to transmit an interrupt request to the controller-side communication unit within the waiting time when intercepting the command addressed to another transport vehicle from the controller-side communication unit during a predetermined event in itself.

In preferred embodiments of the present invention, the controller-side communication unit polls the transport-vehicle-side communication unit with a command. The transport vehicle performs a command and reports its own state from the transport-vehicle-side communication unit to the controller-side communication unit. As described above, the controller-side communication unit performs polling communication with a plurality of transport vehicles in a predetermined order. Meanwhile, when an event affecting transport efficiency occurs on the transport vehicle of the transport-vehicle-side communication unit, the transport-vehicle-side communication unit intercepts a command addressed to another transport vehicle, and then transmits an interrupt request to the controller-side communication unit within the waiting time. This enables the transport-vehicle-side communication unit to preferentially report the event occurring to the system controller without waiting for an order of polling. Thus, the system controller is able to respond promptly to the occurrence of the event to improve the transport efficiency. Examples of events affecting the transport efficiency include completion of unloading and occurrence of an anomaly in the transport vehicle. Receiving a communication addressed to another transport-vehicle-side communication unit is referred to as interception.

It is preferable that when transmitting the interrupt request, the transport-vehicle-side communication unit transmits only the interrupt request to the controller-side communication unit without transmitting a report of the event. Then, the controller-side communication unit transmits interrupt permission to the transport vehicle having transmitted the interrupt request. In contrast, when receiving the interrupt permission from the controller-side communication unit, the transport-vehicle-side communication unit transmits a report of the event to the controller-side communication unit.

Only the interrupt request is transmitted and the report of the event is transmitted after receiving the interrupt permission, so that the waiting time is able to be shortened. This enables delay of communication due to permitting an interrupt to be shortened.

It is more preferable that when intercepting the interrupt permission addressed to another transport vehicle from the controller-side communication unit within the waiting time, the transport-vehicle-side communication unit does not transmit the interrupt request even when the predetermined event occurs. There is no interrupt by another transport-vehicle-side communication unit, so that the transport-vehicle-side communication unit having received the interrupt permission is able to promptly transmit a report of an event to the controller-side communication unit.

It is particularly preferable that when receiving the interrupt permission, the transport-vehicle-side communication unit transmits a report of the event without waiting for elapse of the waiting time. This enables an event having occurred to be reported to the system controller more promptly.

In addition, it is preferable that when not receiving the interrupt permission, the transport-vehicle-side communication unit transmits a report of the event after receiving the command from the controller-side communication unit without repeatedly transmitting an interrupt request. When no interrupt permission is received, events to be reported have occurred also in other transport vehicles to cause a plurality of interrupt requests to interfere with each other in many cases. In this case, when an interrupt permission is again requested at the time of intercepting a subsequent command, interference of an interrupt request is repeated. This causes an interrupt request to be less likely to succeed even when an event to be reported to another transport vehicle newly occurs. Then, when not receiving interrupt permission, the transport-vehicle-side communication unit refrains from transmitting an interrupt request to the controller-side communication unit until receiving a command addressed to itself. As a result, other transport vehicles each can report the occurrence of an event.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENT

Hereinafter, preferred embodiments of the present invention will be described. The scope of the present invention should be determined in accordance with understanding of those skilled in the art based on the description of the scope of claims, in consideration of the description of the specification and well-known techniques in this field.

Figure 1:
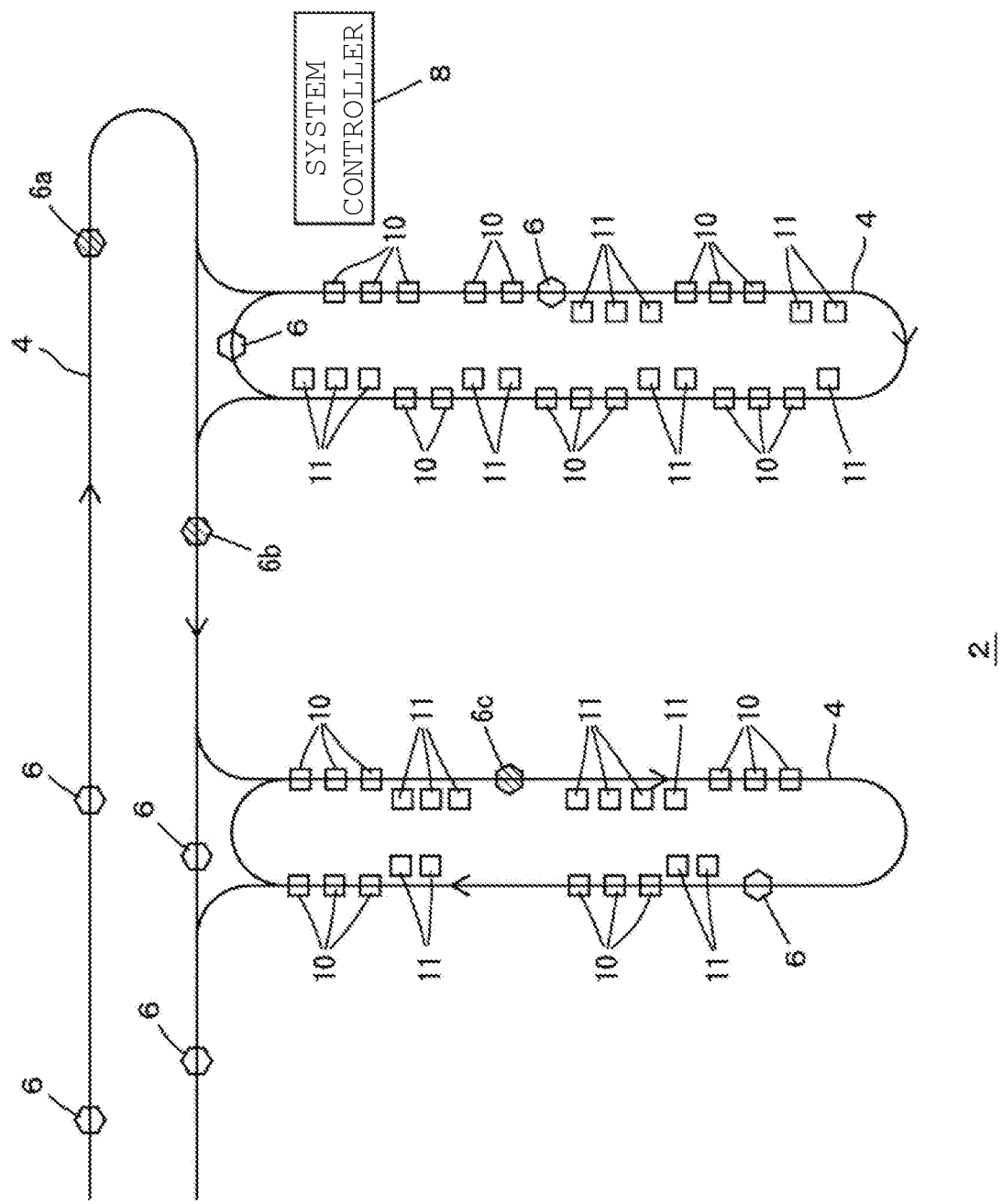
FIG. 1 is a diagram illustrating a layout of a transport vehicle system according to a preferred embodiment of the present invention.

FIGS. 1 to 5 each illustrate a transport vehicle system of a preferred embodiment and a communication method of a preferred embodiment of the present invention. FIG. 1 illustrates a layout of a transport vehicle system 2 in which a plurality of transport vehicles 6 travel along a track 4 provided in a ceiling space or the like in a clean room. The transport vehicle system 2 is controlled by a system controller 8 that polls each of the transport vehicles 6 with a command to inquire a state of the transport vehicle 6 and transmit a command thereto. In transmission of a command from the system controller 8 to each of the transport vehicles 6, the transport vehicle 6 to be addressed is specified. The transport vehicle 6 executes a command from the system controller 8 and reports a current position, a current speed, an execution status of the command, presence/absence of an anomaly, and the like to the system controller 8. Even in the report from the transport vehicle 6 to the system controller 8, the system controller 8 is specified to be addressed. Along the track 4, a plurality of transfer destinations, such as a load port 10 and a buffer 11, are provided, and the transport vehicle 6 transports a package among these transfer destinations according to a command from the system controller 8.

The entire track 4 may be divided into a plurality of blocks (sections), and a controller may be provided for each block so as to communicate with the transport vehicle 6. In this case, the controller for each block may include a controller-side communication unit 15 (built in the system controller 8) illustrated in FIG. 2 so as to communicate with the transport vehicle 6 as in the present preferred embodiment. The transport vehicle 6 may be an automated guided vehicle or the like traveling on the ground without a track.

Figure 2:
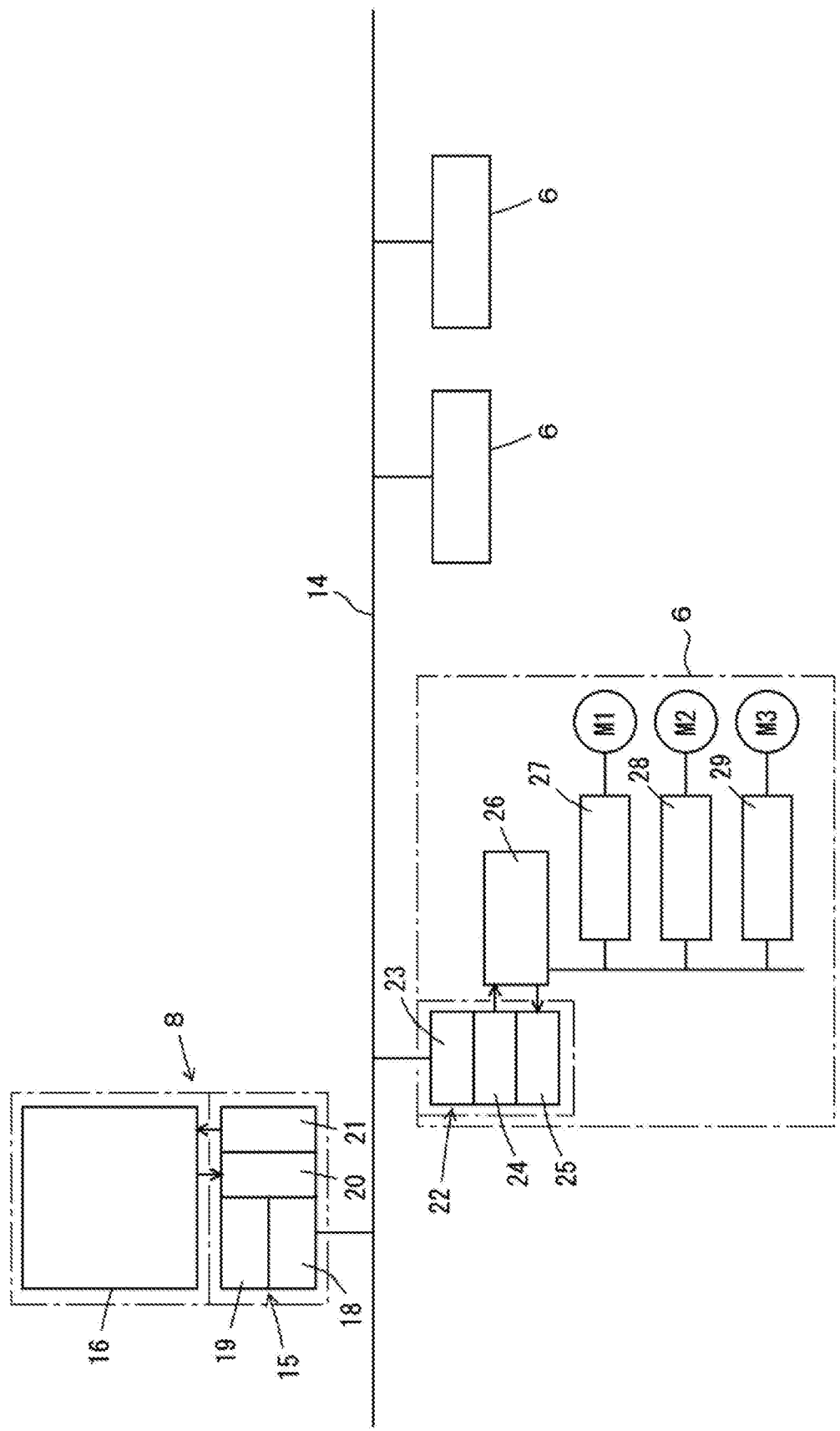
FIG. 2 is a diagram illustrating a configuration relating to communication in a transport vehicle system of a preferred embodiment of the present invention.

FIG. 2 illustrates a communication environment between the system controller 8 and the transport vehicles 6. The system controller 8 and the transport vehicles 6 communicate with each other via a wired network or a wireless LAN 14. The system controller 8 includes the controller-side communication unit 15 (hereinafter may be also referred to as a "communication unit 15") and a controller main body 16 to control the transport vehicles 6. The communication unit 15 includes a LAN interface 18, a polling controller 19 that controls a communication order with the plurality of transport vehicles 6, a transmission buffer 20, and a receive buffer 21. The polling controller 19 controls a transmission order of commands from the LAN interface 18 to the plurality of transport vehicles 6, and processes an interrupt request from each of the transport vehicles 6. The controller main body 16 writes a command in the transmission buffer 20 for each of the transport vehicles 6, and reads out a status report for each of the transport vehicles 6 written in the receive buffer 21.

The transport vehicle 6 includes a transport-vehicle-side communication unit 22 (hereinafter may be referred to as a "communication unit 22"), and the communication unit 22 includes a LAN interface 23, a transmission buffer 24, and a receive buffer 25. Reference numeral 26 denotes a central processing unit of the transport vehicle 6 that receives a command from the system controller 8 via the communication unit 22 to report states, such as a current position, a current speed, a command execution status, and presence/absence of an anomaly, to the system controller 8.

The transport vehicle 6 travels on the track 4 by using a traveling drive 27 and a traveling motor M1, and a lift stage (not illustrated) is moved up and down by a lifting drive 28 and a lifting motor M2. The transport vehicle 6 opens and closes a chuck of the lift stage by using a transfer drive 29 and a transfer motor M3 to deliver a package to a transfer destination or receive a package therefrom.

A communication procedure between the system controller 8 and each of the transport vehicles 6 in the present preferred embodiment will be described. Communication is performed by a polling method via the LAN 14, and the system controller 8 transmits a command (command from the system controller 8 to the transport vehicle 6) to each of the transport vehicles 6 according to a polling order. When receiving a command addressed to itself, each of the transport vehicles 6 reports its own state to the system controller 8. In addition, the transport vehicle 6 does not transmit to the system controller 8 except when receiving a command addressed to itself from the system controller 8 and performing the following interrupt.

The transport vehicle 6 stores data to be transmitted to the system controller 8 and necessity of interrupt in the transmission buffer 24, and stores a command from the system controller 8 in the receive buffer 25. The system controller 8 stores data to be transmitted to the transport vehicle 6 in the transmission buffer 20, and stores data received from the transport vehicle 6 in the receive buffer 21. Then, the polling controller 19 of the system controller 8 manages a polling order and processes an interrupt request from the transport vehicle 6.

Figure 3:
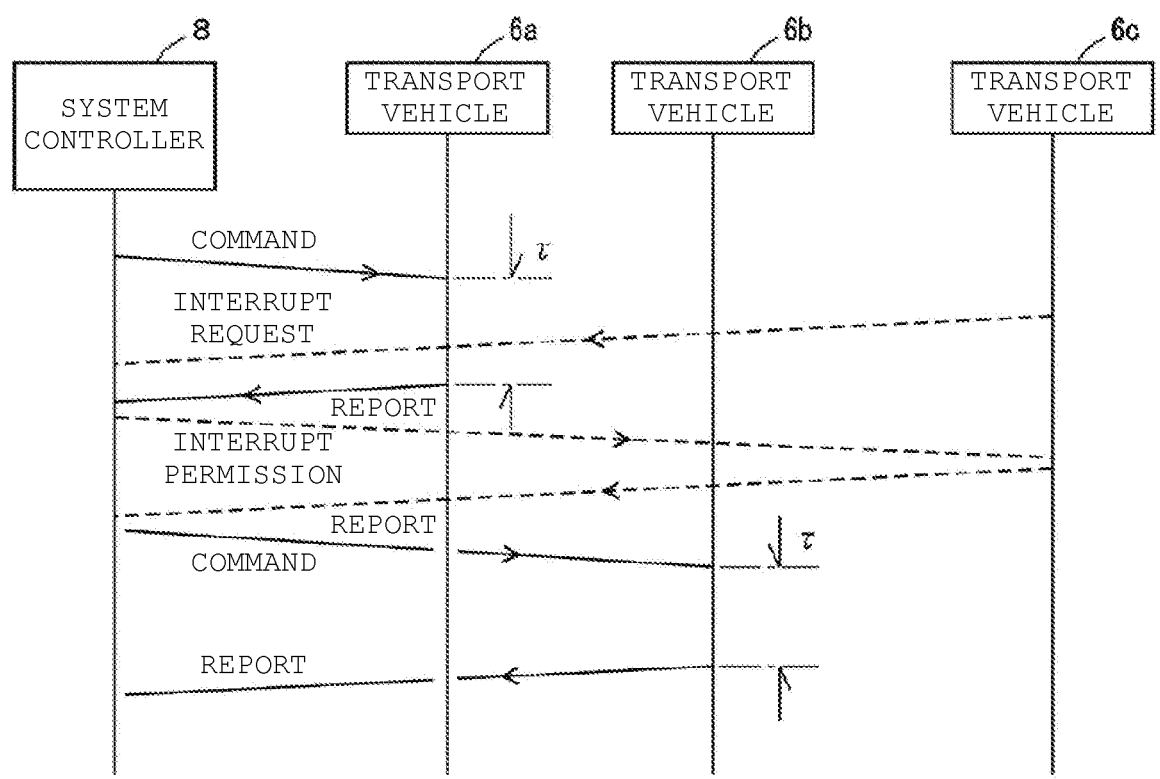
FIG. 3 is a diagram illustrating a communication sequence between a controller-side communication unit and a transport-vehicle-side communication unit in a preferred embodiment of the present invention.

FIG. 3 illustrates based on an assumption that an event affecting transport efficiency, such as completion of unloading or an anomaly, occurs in a transport vehicle 6c immediately before a command is transmitted to a transport vehicle 6a. The system controller 8 can assign a new transport command to the transport vehicle 6c in which unloading is completed. When the transport vehicle 6c has an anomaly, the system controller 8 needs to close a traveling route corresponding to the present position of the transport vehicle 6c, and to cause the subsequent transport vehicle 6 to change its traveling route. Thus, when an event affecting transport efficiency occurs, an interrupt to polling from the system controller 8 is permitted to enable the system controller 8 to respond to the event promptly.

When receiving a command from the communication unit 15, the communication unit 22 of the transport vehicle 6a reports its own state to the communication unit 15 after a predetermined waiting time τ elapses. Here, the communication unit 22 of the transport vehicle 6c in which the event occurs intercepts a command to the transport vehicle 6a, and then transmits an interrupt request to the communication unit 15 during the waiting time τ. The interrupt request includes data to specify that it is transmitted from the transport vehicle 6c, and preferably does not include data to specify a type of the event so as to be able to be transmitted in a short time. The waiting time τ may be made variable by causing the communication unit 15 to designate the waiting time τ with a command.

The communication unit 15 stores an interrupt request received from the communication unit 22 of the transport vehicle 6c in the receive buffer 21. When receiving a status report from the communication unit 22 of the transport vehicle 6a, the communication unit 15 transmits interrupt permission to the communication unit 22 of the transport vehicle 6c by allowing the polling controller 19 to search the receive buffer 21. When receiving the interrupt request as described above, the communication unit 15 transmits interrupt permission before transmitting a command to the next polling destination. In addition, the interrupt permission includes a flag to prohibit an interrupt by a communication unit other than that of the transport vehicle 6c of a transmission destination, so that only the communication unit 22 of the transport vehicle 6c of the transmission destination can respond to the interrupt permission. When receiving the interrupt permission, the communication unit 22 of the transport vehicle 6c reports its own state to the communication unit 15 without waiting time, or immediately after transmission becomes possible. Then, the communication unit 22 of the transport vehicle 6c deletes the event from the transmission buffer 24.

When receiving a report from the communication unit 22 of the transport vehicle 6c, the polling controller 19 of the communication unit 15 deletes the interrupt request from the receive buffer 21. The communication unit 15 then transmits a command to a communication unit 22 of a subsequent transport vehicle 6b according to a polling order. Likewise, the communication unit 15 transmits a command to each of the transport vehicles 6. When receiving the command, the transport vehicle 6 reports its own state to the communication unit 15 after the waiting time τ elapses. The transport vehicle 6 having an event affecting transport efficiency intercepts a command to another transport vehicle 6, and then requests an interrupt within the waiting time τ.

Figure 4:
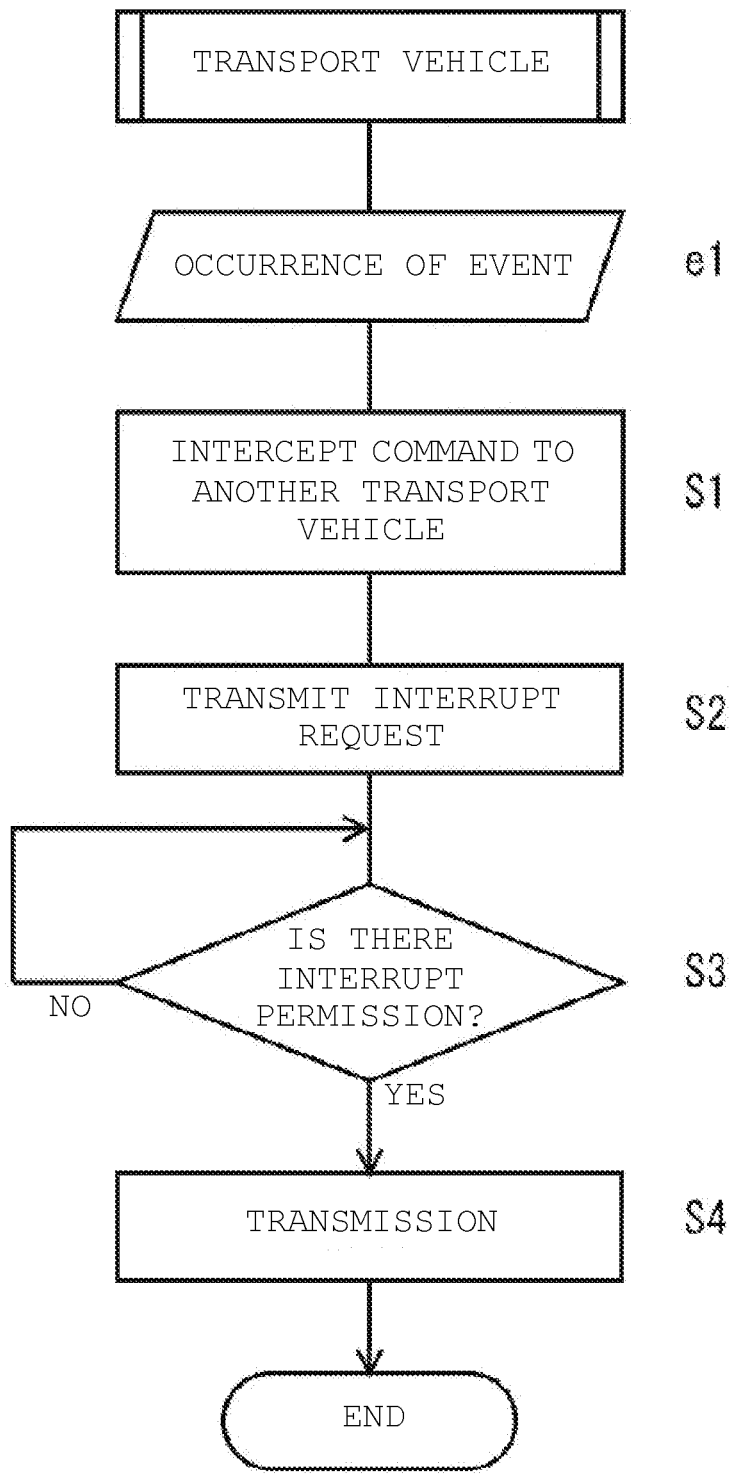
FIG. 4 is a flowchart illustrating an interrupt processing algorithm in a transport-vehicle-side communication unit in a preferred embodiment of the present invention.

FIG. 4 illustrates processes in the transport vehicle 6c in which an event affecting transport efficiency occurs. As in FIG. 3, a transport vehicle that requests an interrupt is referred to as a transport vehicle 6c. When the event occurs (e1), a communication unit 22 of the transport vehicle 6c stores the event together with a flag of an interrupt request in a transmission buffer 24. When intercepting a command to another transport vehicle 6a or the like (step S1), the communication unit 22 transmits an interrupt request to the communication unit 15 within the waiting time τ and deletes the flag of the interrupt request from the transmission buffer 24 (step S2). Thus, when the interrupt request fails, the communication unit 22 of the transport vehicle 6c waits for a command to be transmitted from the communication unit 15 without requesting an interrupt again. The reason why the interrupt request fails is that a plurality of transport vehicles 6 request interrupts at the same time, in many cases. Repeating interrupt requests by the plurality of transport vehicles 6 in this situation may cause the interrupt requests to be less likely to succeed even when an important event newly occurs in another transport vehicle 6. Thus, the transport vehicle 6c having failed in the interrupt request does not request an interrupt again, so that another transport vehicle 6 in which an event newly occurs can request an interrupt. When receiving interrupt permission from the communication unit 15 (step S3), the transport vehicle 6c transmits its own state to the controller-side communication unit 15 without the waiting time τ, and deletes the event from the transmission buffer (step S4).

Figure 5:
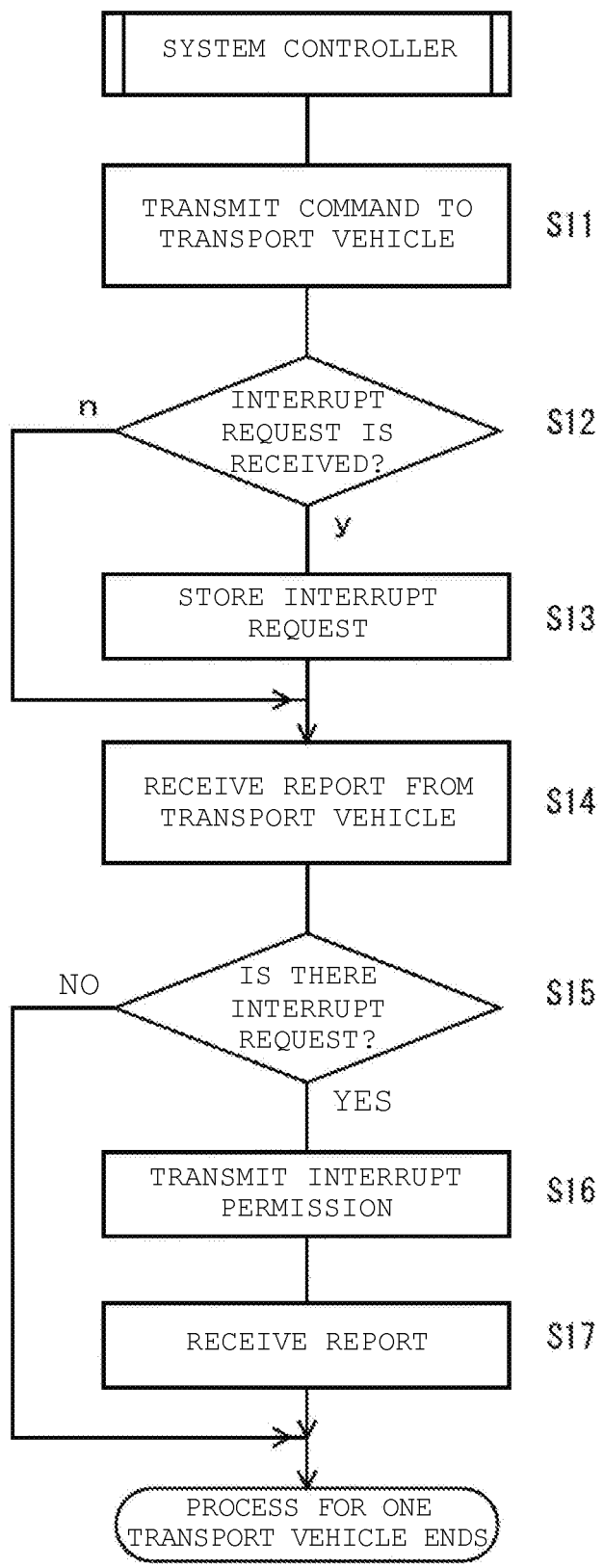
FIG. 5 is a flowchart illustrating an interrupt processing algorithm in a controller-side communication unit in a preferred embodiment of the present invention.

FIG. 5 illustrates interrupt processes in the communication unit 15 of the system controller 8. As in FIG. 3, the transport vehicle 6c requests an interrupt for command transmission to the transport vehicle 6a. The communication unit transmits a command to the communication unit 22 of the transport vehicle 6a according to a polling order (step S11), and when an interrupt request is received (step S12), the interrupt request is stored in the receive buffer 21 (step S13). The interrupt request is transmitted within the waiting time τ, so that a report of a state from the communication unit 22 of the transport vehicle 6a is received (step S14) after the interrupt request is received.

When the interrupt request is stored in the receive buffer 21 (step S15), the polling controller 19 of the communication unit 15 transmits interrupt permission to the communication unit 22 of the transport vehicle 6c (step S16). In contrast, when receiving a report from the communication unit 22 of the transport vehicle 6c (step S17), the polling controller 19 transmits a command to a subsequent transport vehicle.

In the present preferred embodiment, the communication unit 15 of the system controller 8 accepts an interrupt request every time a command is transmitted. However, to reduce the number of times to provide the waiting time τ, a flag or the like to permit or inhibit an interrupt may be added to a command, and an interrupt request may be accepted once every time a command is transmitted twice, for example.

The preferred embodiments of the present invention achieve the following effects and advantages.

When an event affecting transport efficiency occurs, the transport-vehicle-side communication unit 22 is able to preferentially transmit a report of the occurrence of the event to the controller-side communication unit 15 without waiting for an order of polling. Thus, the system controller 8 is able to respond promptly to the occurrence of the event to improve transport efficiency.

The interrupt request from the transport-vehicle-side communication unit 22 is able to be transmitted in a short time without including a status report, so that the waiting time τ is shortened. This enables delay of communication due to permitting an interrupt to be shortened.

There is no re-interrupt by another transport-vehicle-side communication unit for interrupt permission from the controller-side communication unit 15, so that a transport vehicle-side communication unit having received interrupt permission is able to promptly report occurrence of an event to the controller-side communication unit.

In particular, when a transport-vehicle-side communication unit transmits a report of occurrence of an event to the controller-side communication unit immediately after receiving interrupt permission, the occurrence of the event is able to be reported more promptly.

When not receiving interrupt permission even after transmitting an interrupt request, a transport-vehicle-side communication unit reports occurrence of an event after receiving a command to itself. This enables a plurality of transport vehicle-side communication units each having failed in an interrupt request to be prevented from continuing to repeatedly request an interrupt.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport vehicle system comprising:
   a plurality of transport vehicles each including a transport-vehicle-side communicator; and
   a system controller including a controller-side communicator to transmit, according to a predetermined order of the plurality of transport vehicles, a command to a first transport vehicle of the plurality of transport vehicles and to receive a report from the first transport vehicle; wherein
   the system controller controls the plurality of transport vehicles via polling communication;
   the transport-vehicle-side communicator of the first transport vehicle transmits the report to the controller-side communicator when a predetermined waiting time elapses after receiving the command from the controller-side communicator; and
   when a predetermined event occurs in a second transport vehicle of the plurality of transport vehicles different from the first transport vehicle, the transport-vehicle-side communicator of the second transport vehicle transmits an interrupt request to the controller-side communicator within the predetermined waiting time when the command addressed to the first transport vehicle from the controller-side communicator is intercepted by the transport-vehicle-side communicator of the second transport vehicle.

2. The transport vehicle system according to claim 1, wherein
   when transmitting the interrupt request, the transport-vehicle-side communicator of the second transport vehicle transmits only the interrupt request to the controller-side communicator without transmitting a report of the predetermined event; and
   when the transport-vehicle-side communicator of the second transport vehicle receives an interrupt permission from the controller-side communicator, the transport-vehicle-side communicator of the second transport vehicle transmits the report of the predetermined event to the controller-side communicator; and
   the controller-side communicator transmits the interrupt permission to the second transport vehicle.

3. The transport vehicle system according to claim 2, wherein, when the transport-vehicle-side communicator of the second transport vehicle intercepts an interrupt permission addressed to the another transport vehicle from the controller-side communicator within the predetermined waiting time, the transport-vehicle-side communicator of the second transport vehicle does not transmit the interrupt request even when the predetermined event occurs.

4. The transport vehicle system according to claim 3, wherein when receiving the interrupt permission, the transport-vehicle-side communicator of the second transport vehicle transmits the report of the predetermined event without waiting for the predetermined waiting time to elapse.

5. The transport vehicle system according to claim 2, wherein, when not receiving the interrupt permission, the transport-vehicle-side communicator of the second transport vehicle transmits the report of the predetermined event after receiving the command from the controller-side communicator without repeatedly transmitting an interrupt request.

6. A communication method in a transport vehicle system including a plurality of transport vehicles each including a transport-vehicle-side communicator, a system controller including a controller-side communicator to transmit, according to a predetermined order of the plurality of transport vehicles, a command to a first transport vehicle of the plurality of transport vehicles and to receive a report from the first transport vehicle, the system controller controlling the plurality of transport vehicles via polling communication, the communication method comprising:
   causing the transport-vehicle-side communicator of the first transport vehicle to transmit the report to the controller-side communicator when a predetermined waiting time elapses after the transport-vehicle-side communicator of the first transport vehicle receives the command from the controller-side communicator; and when a predetermined event occurs in a second transport vehicle of the plurality of transport vehicles different from the first transport vehicle, causing the transport-vehicle-side communicator of the second transport vehicle to transmit an interrupt request to the controller-side communicator within the predetermined waiting time when the command addressed to the first transport vehicles from the controller-side communicator is intercepted by the transport-vehicle-side communicator of the second transport vehicle.

\* \* \* \* \*